United States Patent
Kim et al.

(10) Patent No.: US 11,451,018 B2
(45) Date of Patent: Sep. 20, 2022

(54) HIGH SPEED EARTHING SWITCH OF GAS INSULATED SWITCHGEAR

(71) Applicant: LS ELECTRIC CO., LTD., Anyang-si (KR)

(72) Inventors: Hyoungjin Kim, Anyang-si (KR); Wooseung Lim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/285,025

(22) PCT Filed: Oct. 14, 2019

(86) PCT No.: PCT/KR2019/013403
§ 371 (c)(1),
(2) Date: Apr. 13, 2021

(87) PCT Pub. No.: WO2020/091261
PCT Pub. Date: May 7, 2020

(65) Prior Publication Data
US 2021/0320481 A1 Oct. 14, 2021

(30) Foreign Application Priority Data
Oct. 30, 2018 (KR) ........................ 10-2018-0131206

(51) Int. Cl.
*H01H 33/91* (2006.01)
*H02B 13/075* (2006.01)

(52) U.S. Cl.
CPC .......... *H02B 13/075* (2013.01); *H01H 33/91* (2013.01)

(58) Field of Classification Search
CPC .. H01H 33/91; H01H 33/703; H01H 33/7038; H01H 33/7046; H01H 33/7053;
(Continued)

(56) References Cited

U.S. PATENT DOCUMENTS

| | | | | |
|---|---|---|---|---|
| 4,107,498 A | * | 8/1978 | Golota | H01H 31/32 218/80 |
| 4,255,632 A | * | 3/1981 | Backskog | H02B 13/075 218/55 |
| 4,413,166 A | * | 11/1983 | Meyer | H01H 31/32 218/80 |
| 4,517,425 A | * | 5/1985 | Martin | H01H 33/901 218/66 |

(Continued)

FOREIGN PATENT DOCUMENTS

| | | | | |
|---|---|---|---|---|
| CN | 105448591 | * | 3/2016 | ............. H01H 33/91 |
| JP | H02037209 U | | 3/1990 | |

(Continued)

OTHER PUBLICATIONS

Translation CN105448591 (Original document published Mar. 30, 2016) (Year: 2016).*

(Continued)

*Primary Examiner* — William A Bolton
(74) *Attorney, Agent, or Firm* — K&L Gates LLP (57) ABSTRACT

The present disclosure relates to a high speed earthing switch of a gas insulated switchgear and, more specifically, to a high speed earthing switch of a gas insulated switchgear, which includes an air blower so as to secure an improved arc interruption performance. A high speed earthing switch of a gas insulated switchgear according to an embodiment of the present disclosure comprises: an outer case; a cylinder member installed inside the outer case and having a ventilation hole formed along the lower circumferential surface; and a piston member installed to be inserted into the cylinder member, and moving backward and forward by means of a force transferred from a driving unit so as to inject air inside the cylinder member to a contact part when the cylinder member is opened.

10 Claims, 13 Drawing Sheets

(58) Field of Classification Search
CPC .............. H01H 33/7076; H01H 33/904; H01H 33/905; H01H 2033/906; H01H 2033/908; H01H 31/003; H01H 31/14; H01H 31/16; H01H 31/126; H02B 13/075; H02B 13/035
USPC ........ 218/55–57, 59, 61, 66, 67, 79, 80, 100
See application file for complete search history.

(56) References Cited

U.S. PATENT DOCUMENTS

| | | | |
|---|---|---|---|
| 5,543,597 A * | 8/1996 | Watanabe | H01H 31/003 218/59 |
| 6,559,403 B2 * | 5/2003 | Gutalj | H01H 31/24 218/43 |
| 7,919,720 B2 * | 4/2011 | Shimizu | H01H 31/003 218/55 |
| 8,389,886 B2 | 3/2013 | Dahlquist et al. | |
| 2011/0192821 A1 | 8/2011 | Dufournet | |
| 2018/0197709 A1 * | 7/2018 | Liu | H01H 9/0072 |

FOREIGN PATENT DOCUMENTS

| | | |
|---|---|---|
| JP | 04-048083 U | 4/1992 |
| JP | H06-023133 U | 3/1994 |
| JP | 07122165 A | 5/1995 |
| JP | H07143625 | 6/1995 |
| JP | H08007726 A | 1/1996 |
| JP | 08222096 | 8/1996 |
| JP | H09219135 A | 8/1997 |
| JP | 2009048789 A | 3/2009 |
| JP | 2016092871 A | 5/2016 |
| JP | 2018006214 A | 1/2018 |
| KR | 2019890004646 Y1 | 7/1989 |
| KR | 101550299 B1 | 8/2015 |
| KR | 1020160118639 A | 10/2016 |

OTHER PUBLICATIONS

Korean Office Action for related Korean Application No. 10-2018-0131206; action dated Mar. 5, 2020; (4 pages).

Korean Notice of Allowance for related Korean Application No. 10-2018-0131206; action dated Jul. 1, 2020; (5 pages).

International Search Report for related International Application No. PCT/KR2019/013403; report dated Jan. 21, 2020; (5 pages).

Written Opinion for related International Application No. PCT/KR2019/013403; report dated Jan. 21, 2020; (4 pages).

Japanese Office Action for related Japanese Application No. 2021-518943; action dated Apr. 26, 2022; (5 pages).

* cited by examiner

Fig. 1

Prior Art

Fig. 2

Prior Art

Fig. 3

Prior Art

HIGH SPEED EARTHING SWITCH OF GAS INSULATED SWITCHGEAR

CROSS-REFERENCE TO RELATED APPLICATIONS

This application is the National Stage filing under 35 U.S.C. 371 of International Application No. PCT/KR2019/013403, filed on Oct. 14, 2019, which claims the benefit of earlier filing date and right of priority to Korean Application No. 10-2018-0131206, filed on Oct. 30, 2018, the contents of which are all hereby incorporated by reference herein in their entirety.

FIELD

The present disclosure relates to a high-speed (or high speed) earthing switch of a gas insulated switchgear, and more particularly, a high-speed earthing switch of a gas insulated switchgear having an air blower to improve the arc interruption performance.

BACKGROUND

A gas insulated switchgear (GIS) is an electric device that is usually installed between a power supply side and a load side of an electric system to protect a power system and load equipment by interrupting current when the circuit is opened or closed intentionally or deliberately in normal conditions, or when a fault current such as a ground fault and a short circuit occurs.

Such a GIS generally includes a bushing unit that receives power from a high-voltage power source, a gas circuit breaker (CB), a disconnect switch (or disconnector), an earthing switch, a moveable part, a control unit, and the like.

Here, the earthing switch is a device that is installed in a portion of a circuit to manually ground a main circuit during maintenance and inspection, and to remove the remaining current in a conductor upon conducting maintenance or inspection.

Figure 1:
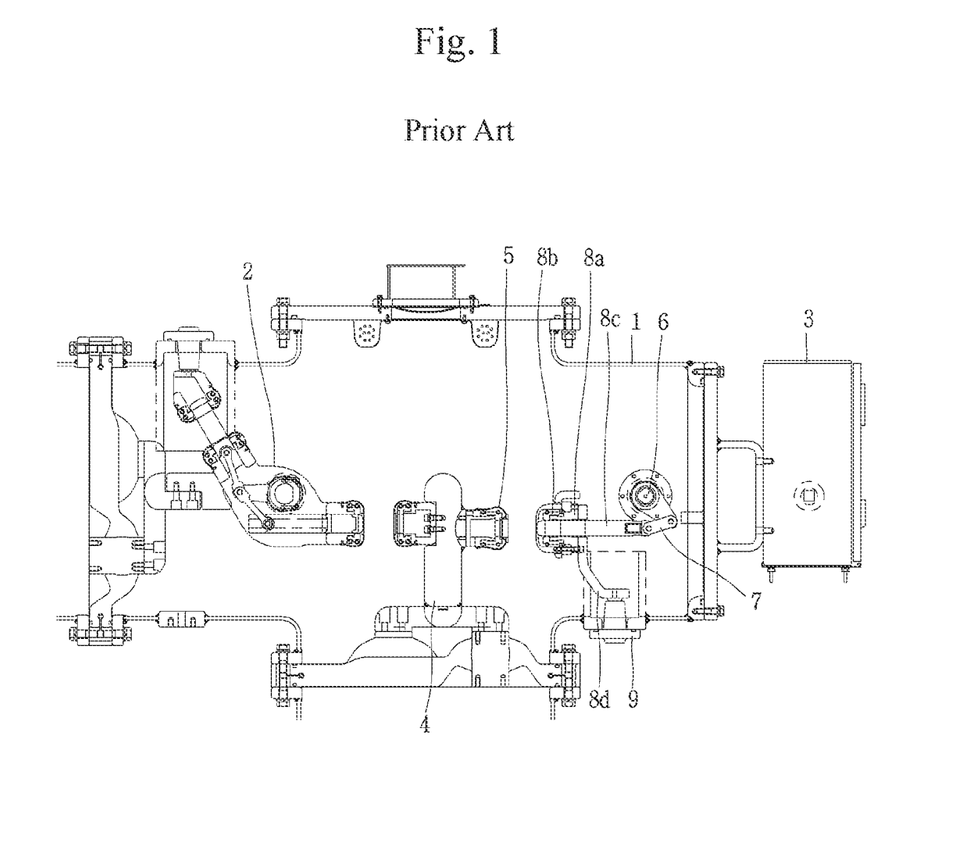
FIG. 1 illustrates an internal structure of a gas insulated switchgear according to the related art.

FIG. 1 shows an internal structure of a gas insulated switchgear according to the related art.

As illustrated, a disconnect/earthing switch (DS/ES) 2 and a high-speed earthing switch (HSES) 5, 9, 10 are installed inside an enclosure 1. A drive or operation unit 3 is provided at an outside of the enclosure 1.

The HSES is mainly divided into a fixed part 5 and a movable (or moving) part.

The fixed part 5 is provided at a conductor 4 disposed in the enclosure 1. The fixed part 5 includes a fixed contact 5a and a fixed contact holder 5b (see FIG. 2).

The movable part includes a movable (or moving) shaft 6 that is connected to the drive unit 3 to rotate, a connector link 7 that is connected to the moveable shaft 6 by a crank, a movable contact holder 8a and a movable contact 8b that are fixedly installed inside the enclosure 1, and a mover 8c that is connected to the connector link 7 so as to connect or disconnect the movable contact 8b and the fixed contact 5a while moving forward and backward. In addition, a bus bar 9 that connects the movable part and an earth (or ground) terminal 8d is provided. The bus bar 9 may connect the movable contact holder 8a and the earth terminal 8d.

As such, the HSES consists of the fixed part and the movable part in contact with or separated from the fixed part and is usually installed at a power supply input end to discharge current of a power line. The HSES should have electrostatic induction current switching performance, electromagnetic induction switching performance, fast acting capacity (class E1 HSES with a capability to perform two closing operations), fast conduction performance, etc.

The performance of the HSES according to the related art is determined by a switching speed, and interruption failure may occur even if the switching speed is fast depending on a type of insulating gas. For example, interruption failure is more likely to occur in an air insulated switchgear than in a SF6 gas insulated switchgear.

Figure 2:
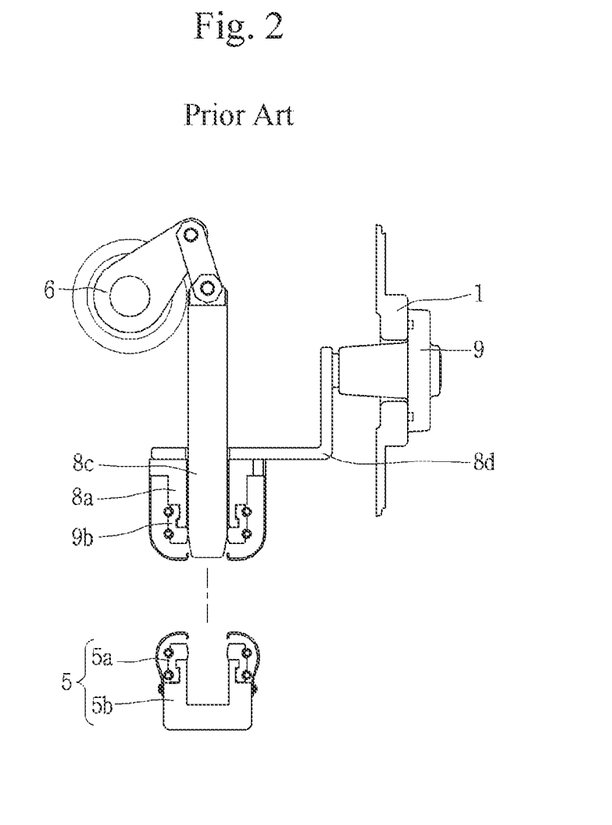
FIG. 2 shows an open state of the high-speed earthing switch.
Figure 3:
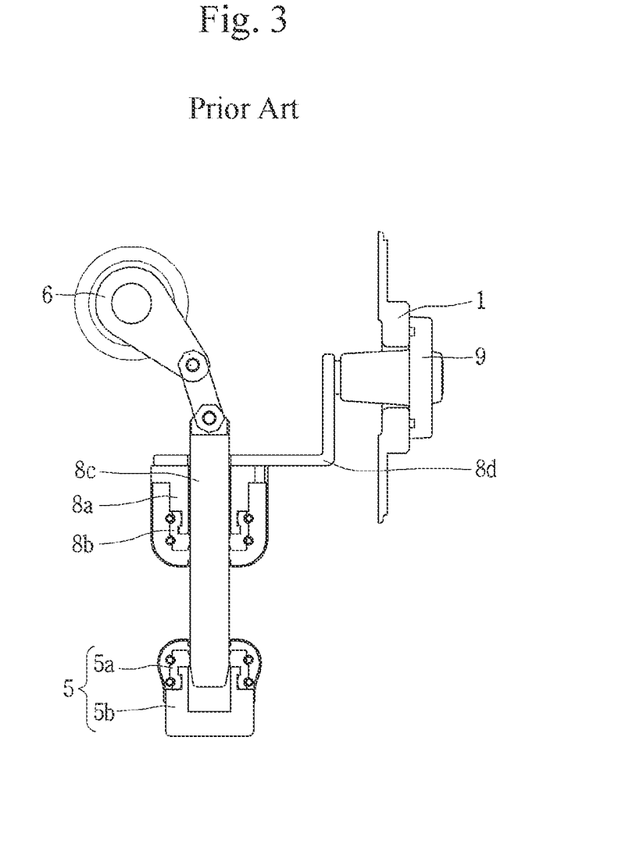
FIG. 3 shows a closed (ground) state of the high-speed earthing switch.

FIGS. 2 and 3 illustrate how an HSES of the gas insulated switchgear according to the related art works. FIG. 2 shows an open state of the HSES, and FIG. 3 shows a ground state of the HSES.

In the HSES of the gas insulated switchgear according to the related art, a movable shaft 6 is rotated by power transferred from the drive unit 3, and the mover 8c that is connected to the movable shaft 6 connects (closes) a ground circuit (connection between the movable contact and the fixed contact), or disconnects (opens) the ground circuit (disconnection between the movable contact and the fixed contact) while moving forward and backward.

In the closed (ground) state, current flows to an external ground through the fixed contact holder 5b, the fixed contact 5a, the mover 8c, the movable contact 8b, the movable contact holder 8a, the bus bar 9, and the earth terminal 8d.

However, depending on a type of insulating gas, an interruption failure may occur in the conventional HSES of the gas insulated switchgear due to a prolonged arcing time during interruption.

SUMMARY

Therefore, an aspect of the present disclosure is to obviate the above-mentioned problem and other drawbacks, namely, to provide a high-speed earthing switch of a gas insulated switchgear equipped with an air blower to achieve improved arc interruption performance.

A high speed earthing switch of a gas insulated switchgear according to an implementation of the present disclosure may include: an enclosure; a cylinder member that is installed inside the enclosure and has a vent hole formed at a lower portion along a circumferential surface thereof; and a piston member that is insertedly installed in the cylinder member and moves forward and backward by receiving force from a drive unit so as to inject air inside the cylinder member to a contact portion when in an open state.

A cylinder hole may be formed in a lower surface of the cylinder member so as to allow the piston member to move along a lengthwise direction.

A plurality of vent holes may be formed at the lower portion of the cylinder member along the circumferential surface thereof.

A lateral hole may be formed at an intermediate portion of the piston member.

The piston member may be provided with a longitudinal hole that extends from the lateral hole to a lower end thereof.

A fixed plate may be installed at the intermediate portion of the piston member.

The fixed plate may be disposed below the lateral hole.

A plurality of plate through holes may be formed in the fixed plate.

A movable plate may be disposed above the fixed plate in a manner of sliding along the piston member.

The movable plate may have an outer diameter smaller than an outer diameter of the fixed plate.

The outer diameter of the movable plate may have a size that is enough to completely cover the plate through holes when the movable plate is in contact with the fixed plate.

The movable plate may be provided with a central hole that has a guide portion with a predetermined height.

Lengthwise directions of the cylinder member and the piston member may be directions other than a horizontal direction.

According to a high-speed earthing switch of a gas insulated switchgear according to an implementation of the present disclosure, an air blower that blows wind to a fixed part when the high-speed earthing switch is open is provided. This allows the arc to be quickly extinguished. Accordingly, the arc interruption performance may be achieved regardless of a type of insulating gas.

Here, a piston member applied to the air blower is integrally formed with a mover, and thus, the arc interruption performance may be improved without an increase in the number of components (parts) or occupied space.

In the air blower, as a fixed plate, a movable plate that is disposed to be spaced apart from the fixed plated, and air flow holes formed in the fixed plate and a cylinder member, the flow of air that is injected to the fixed part via the air flow holes may be achieved while preventing a reduction in movement speed of the piston member that serves as a mover.

BRIEF DESCRIPTION OF THE DRAWINGS

FIGS. 2 and 3 shows how a high-speed earthing switch of the gas insulated switchgear according to the related art works.

FIGS. 6 and 9 show how the high-speed earthing switch of the gas insulated switchgear according to one implementation of the present disclosure works.

FIGS. 10 and 11 show how a high-speed earthing switch of the gas insulated switchgear according to another implementation of the present disclosure works.

FIGS. 12 and 13 show how a high-speed earthing switch of the gas insulated switchgear according to still another implementation of the present disclosure works.

DETAILED DESCRIPTION

Hereinafter, implementations of the present disclosure will be described in detail with reference to the accompanying drawings. Also, it should be noted that the accompanying drawings are merely illustrated to easily understand the implementations disclosed in the specification, and therefore, they should not be construed to limit the technical spirit and scope disclosed in the specification.

A high-speed earthing switch of a gas insulated switchgear according to implementations of the present disclosure will be described in detail with reference to the drawings.

FIRST EXAMPLE

Figure 4:
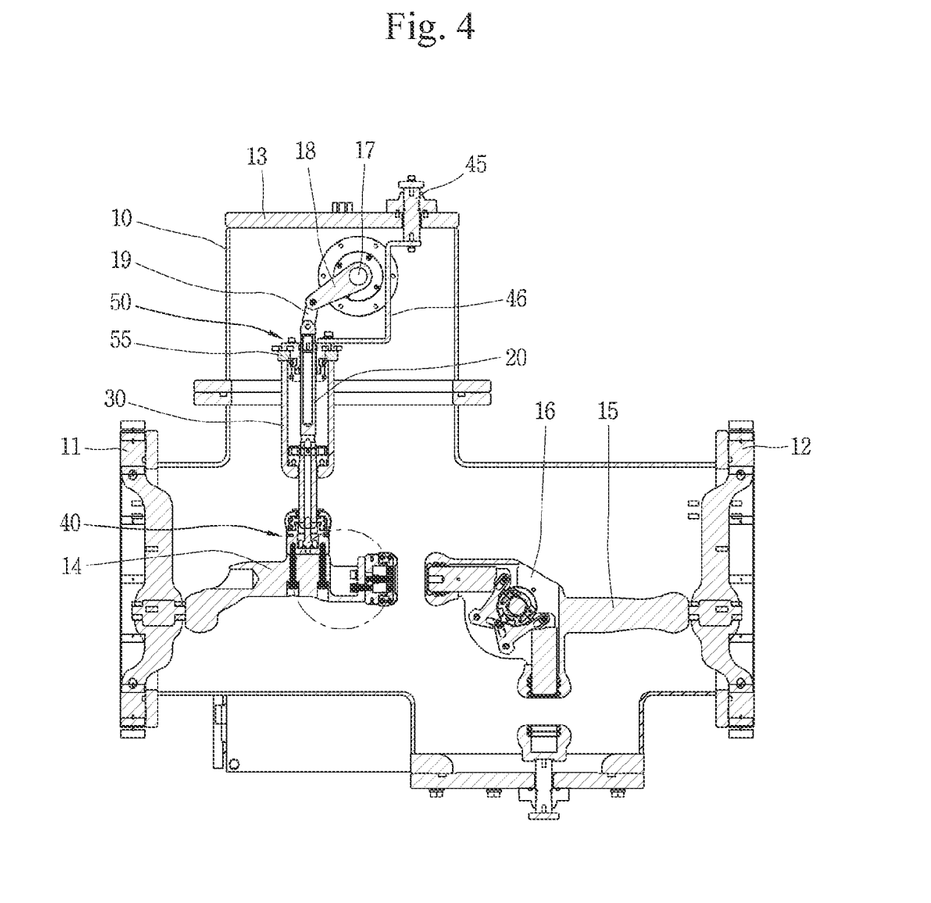
FIG. 4 illustrates an internal structure of a gas insulated switchgear according to one implementation of the present disclosure.

A high-speed earthing switch of a gas insulated switchgear according to one implementation of the present disclosure includes an enclosure 10, a movable shaft 17 that is installed at a portion of the enclosure 10, a cylinder member 30 that is installed to be spaced apart from the movable shaft 17, a piston member 20 that is insertedly installed in the cylinder member 30 and is connected to the movable shaft 17 to move forward and backward so as to allow air in the cylinder member 30 to be injected into a contact portion.

The enclosure (tank or outer case) 10 may have a box shape to accommodate a disconnect switch, an earthing switch, or the like therein. At least one of upper, lower, left, right, front, and rear portions or parts of the enclosure 10 may be open. The enclosure 10 may define a portion of the entire enclosure constructing the gas insulated switchgear. The enclosure 10 may be one of compartments of the entire enclosure that constructs the gas insulated switchgear. The enclosure 10 may be configured to be closed, except for a conductor connecting portion (socket), so as to be insulated from the outside.

Spacers 11, 12, and 13 are coupled to open portions of the enclosure 10, respectively. The spacers 11, 12, and 13 serve to divide a boundary of the enclosure 10 and support a conductor inserted (penetrating).

A plurality of conductors 14 and 15 is installed inside the enclosure 10. The conductors 14 and 15 define a portion of a circuit or are connected to a portion of the circuit. The conductors 14 and 15 may be configured as a first conductor 14 that is coupled to the spacer 11 (first spacer) and a second conductor 15 that is connected to the spacer 12 (second spacer). Each of the conductors 14 and 15 may be provided in plurality. For example, in the case of a three-phase circuit, the conductors 14 and 15 may be provided in three pairs, respectively.

A disconnect/earthing switch (DS/ES) 16 is provided between the first conductor 14 and the second conductor 15.

The high-speed earthing switch is provided in the enclosure 10. The high-speed earthing switch includes a fixed part 40 and a movable part 50.

The fixed part 40 of the high-speed earthing switch is installed at the first conductor 14. The fixed part 40 of the high-speed earthing switch includes a fixed part holder (or holder) 41, a fixed contact 42, and a fixed part shield (or shield) 43 (see FIG. 6). Here, the fixed contact 42 may be configured as a plurality of chips arranged in a circular (radial) shape.

The movable part 50 is installed to be spaced apart from the first conductor 14. The movable part 50 includes the movable shaft 17, the piston member 20 that serves as a mover, a movable part holder (or holder) 51, and a movable contact 52.

A drive unit (not shown) is provided at an outside of the enclosure 10. The drive unit provides a driving force for operating the high-speed earthing switch.

The movable shaft 17 is formed through the enclosure 10. The movable shaft 17 is connected to the drive unit. The movable shaft 17 is rotated by power transferred from the drive unit. Here, the movable shaft 17 is provided with a first crank lever 18.

A link 19 is connected to the first crank lever 18. The link 19 has one end connected to the first crank lever 18 and another end connected to the piston member 20. The link 19 transfers motion of the movable shaft 17 to the piston member 20. A rotational motion or movement of the movable shaft 17 is converted into a linear motion of the piston member 20 by the first crank lever 18 and the link 19.

The piston member 20 is connected to the link 19. The piston member 20 moves back and forth (up and down). The piston member 20 is configured as a bar-shaped conductor.

An earth (or ground) terminal 45 is installed at the enclosure 10. The earth terminal 45 may be made of a material having excellent electrical conductivity, such as aluminum (Al) and copper (Cu). The earth terminal 45 is inserted and installed in a manner of penetrating through the enclosure 10. That is, an inner end of the earth terminal 45 is disposed inside the enclosure 10, and an outer end of the earth terminal 45 is disposed outside the enclosure 10. The earth terminal 45 is also referred to as an "earth bushing". A portion of the earth terminal 45 that is exposed to the outside of the enclosure 10 may be protected by an insulating member. An outer side of the earth terminal 45 is connected to an external earth terminal (not shown).

A bus bar 46 that connects the earth terminal 45 and the piston member 20 is provided.

One end of the bus bar 46 is connected to the inner end of the earth terminal 45 and another end of the bus bar 46 is connected to the movable part holder 51.

A support member 55 is provided to support the movable part 50. The support member 55 is fixedly installed in the enclosure 10.

The movable part holder 51 is installed at the support member 55. The movable part holder 51 is installed at the support member 55 in a penetrating manner. The bus bar 46 is connected to an upper end of the movable part holder 51. The movable contact 52 is provided at a lower end of the movable part holder 51. The movable contact 52 may be configured as a plurality of chips arranged in a circular (radial) shape. A first wear ring 53 is provided between the movable part holder 51 and the piston member 20.

When the piston member 20 moves downward and is brought into contact with the fixed part 40, the remaining current in the first conductor 14 is discharged to the outside through the fixed part 40, the piston member 20, the movable contact 52, the movable part holder 51, the bus bar 46, and the earth terminal 45.

Air blower (or centrifugal fan) includes the movable shaft 17, the piston member 20, the cylinder member 30, a fixed plate 60, and a movable (or moving) plate 70 (other mechanisms or devices that transfer force from the drive unit to the piston member may be applied). Please refer to FIGS. 4 to 6.

Figure 5:
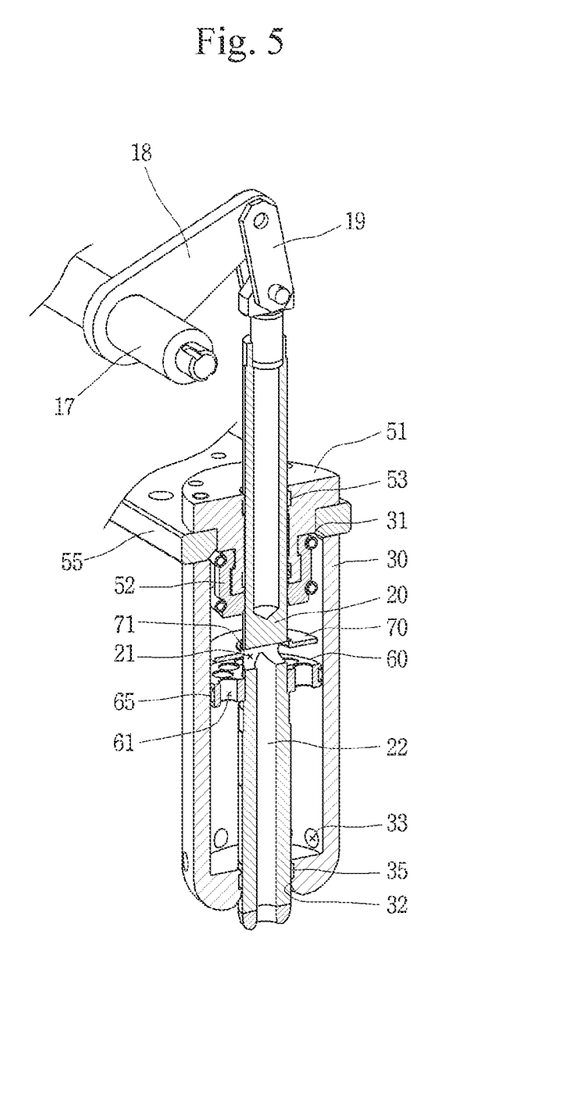
FIG. 5 is a cutaway view of an air blow of the high-speed earthing switch in FIG. 4.

The cylinder member 30 is installed at a lower portion of the support member 55. The cylinder member 30 may be have a cylindrical shape. The cylinder member 30 provides a space in which the piston member 20 is inserted to be moved. The piston member 20 penetrates through the cylinder member 30 in a lengthwise direction to move linearly.

An upper surface of the cylinder member 30 is open such that an opening portion 31 is formed. The piston member 20, the movable contact 52, the movable part holder 51, the fixed plate 60, the movable plate 70, and the like are inserted and installed through the opening portion 31.

A cylinder hole 32 is formed in a lower surface of the cylinder member 30 through which the piston member 20 can move (enter and exit) along the lengthwise direction (longitudinal direction). Here, a second wear ring 35 may be provided at the cylinder hole 32. The second wear ring 30 allows friction to be reduced when the piston member 20 slides through the cylinder hole 32.

A plurality of vent (or ventilation) holes 33 is radially formed in a lower portion of the cylinder member 30 along a circumferential surface thereof. Air outside the cylinder member 30 is introduced into the cylinder member 30 through the vent holes 33, or air inside the cylinder member 30 is discharged to the outside of the cylinder member 30 through the vent holes 33.

The piston member 20 has a circular bar shape. The piston member 20 is connected to the movable shaft 17 through the first crank lever 18 and the link 19 so as to move forward and backward. The piston member 20 provides power to deliver air by moving the fixed plate 60 and the movable plate 70. In addition, the piston member 20 serves as a mover that connects the movable contact 52 and the fixed contact 42. That is, the piston member 20 is integrally formed with the mover.

A lateral hole 21 is formed at an intermediate or middle portion of the piston member 20. This may allow air to flow along the lateral hole 21 inside the cylinder member 30. Here, the lateral hole 21 is located above the fixed plate 60.

A longitudinal hole 22 that extends from the lateral hole 21 to a lower end of the piston member 20 is provided in the piston member 20. Accordingly, air in the cylinder member 30 may flow out of the cylinder member 30 along the lateral hole 21 and the longitudinal hole 22. That is, the lateral hole 21 and the longitudinal hole 22 serve as air flow paths or passages.

The fixed plate 60 is installed at the piston member 20. The fixed plate 60 is installed at an intermediate portion of the piston member 20. The intermediate portion of the piston member 20 may be formed in a stepped manner to allow the fixed plate 60 to be more easily mounted. The fixed plate 60 is disposed below the lateral hole 21. Accordingly, when the fixed plate 60 is moved upward, air at an upper part of the fixed plate 60 inside the cylinder member 30 is discharged to the outside (lower part) of the cylinder member 30 through the lateral hole 21 and the longitudinal hole 22.

Since the fixed plate 60 is provided in the cylinder member 30, air in the cylinder member 30 is pushed when the piston member 20 moves linearly in the longitudinal direction, allowing the air to flow upward or downward.

A plurality of plate through holes 61 is formed in the fixed plate 60. The plate through holes 61 are formed along the longitudinal direction of the cylinder member 30. Accordingly, when the piston member 20 linearly moves in the longitudinal direction, air may escape along the plate through holes 61.

An outer diameter of the fixed plate 60 may be, preferably, similar to an inner diameter of the cylinder member 30. A circumferential groove (no reference numeral) is formed along an outer circumferential surface of the fixed plate 60, and a third wear ring 65 is provided at the circumferential groove. The third wear ring 65 allows the fixed plate 60 to smoothly slide along an inner surface of the cylinder member 30.

The movable plate 70 is disposed above the fixed plate 60. The movable plate 70 may have a plate shape in the form of a ring (disk). An outer diameter of the movable plate 70 is less (smaller) than the outer diameter of the fixed plate 60. Accordingly, the movable plate 70 can move freely without friction with the inner surface of the cylinder member 30.

In addition, the outer diameter of the movable plate 70 has a size that can completely cover the plate through holes 61 when the movable plate 70 is brought into contact with the fixed plate 60. Accordingly, when the piston member 20 goes down, the movable plate 70 may be separated from the fixed plate 60 by pressure of air flowing through the plate through holes 61. When the piston member 20 goes up, the movable plate 70 moves together with the fixed plate 60 in a state of closing (or covering) the plate through holes 61.

The movable plate 70 is provided therein with a central hole (no reference numeral) so as to allow the piston member 20 to be installed therethrough. The movable plate 70 slides along the piston member 20.

A guide portion 71 is formed along a circumference of the central hole of the movable plate 70. The guide portion 71 is implemented as a wall having a predetermined height. The guide portion 71 guides such that the movable plate 70 may smoothly slide along the piston member 20.

The movable plate 70 is installed above the fixed plate 60 to move up and down together with the fixed plate 60 by its own weight. When the fixed plate 60 moves upward, the movable plate 70 moves while being in contact with the fixed plate 60 as it is pushed by the fixed plate 60. When the fixed plate 60 moves downward, the movable plate 70 moves downward in a state of being spaced apart from the fixed plate 60 by a predetermined distance by pressure of air flowing through the plate through holes 61 of the fixed plate 60. When the movement of the fixed plate 60 is stopped, the movable plate 70 is brought into contact with the fixed plate 60 since there is no pressure by air.

The lengthwise directions (operating directions) of the cylinder member 30 and the piston member 20 are directions other than a horizontal direction. Preferably, the lengthwise directions of the cylinder member 30 and the piston member 20 may be defined in a vertical direction. Accordingly, when closing or opening action (or operation) is completed, that is, when there is no action of pneumatic pressure, the plate through holes 61 are closed as the movable plate 70 is in contact with the fixed plate 60.

With reference to FIGS. 6 to 9, how the high-speed earthing switch of the gas insulated switchgear according to the one implementation of the present disclosure works will be described.

First, a closing action will be described.

Figure 6:
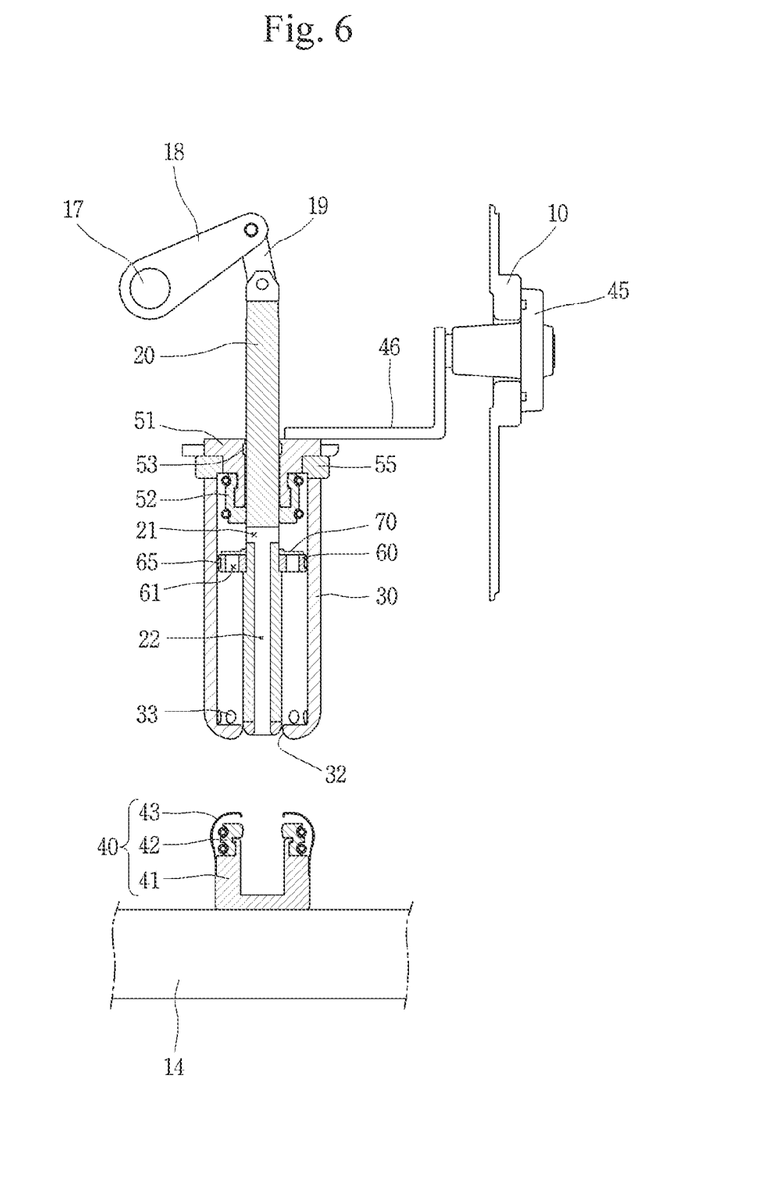
FIG. 6 shows an open state.

FIG. 6 shows an open state of the high-speed earthing switch. Since the piston member 20 that serves as a mover has been moved upward by the movable shaft 17, the piston member 20 is separated from the fixed contact 42. That is, as the movable contact 52 and the fixed contact 42 are disconnected from each other, the ground circuit is open.

The lower end of the piston member 20 is located at a position of the cylinder hole 32 of the cylinder member 30, and the fixed plate 60 is located at an upper part of the cylinder member 30. The movable plate 70 is in contact with an upper portion of the fixed plate 60.

Figure 7:
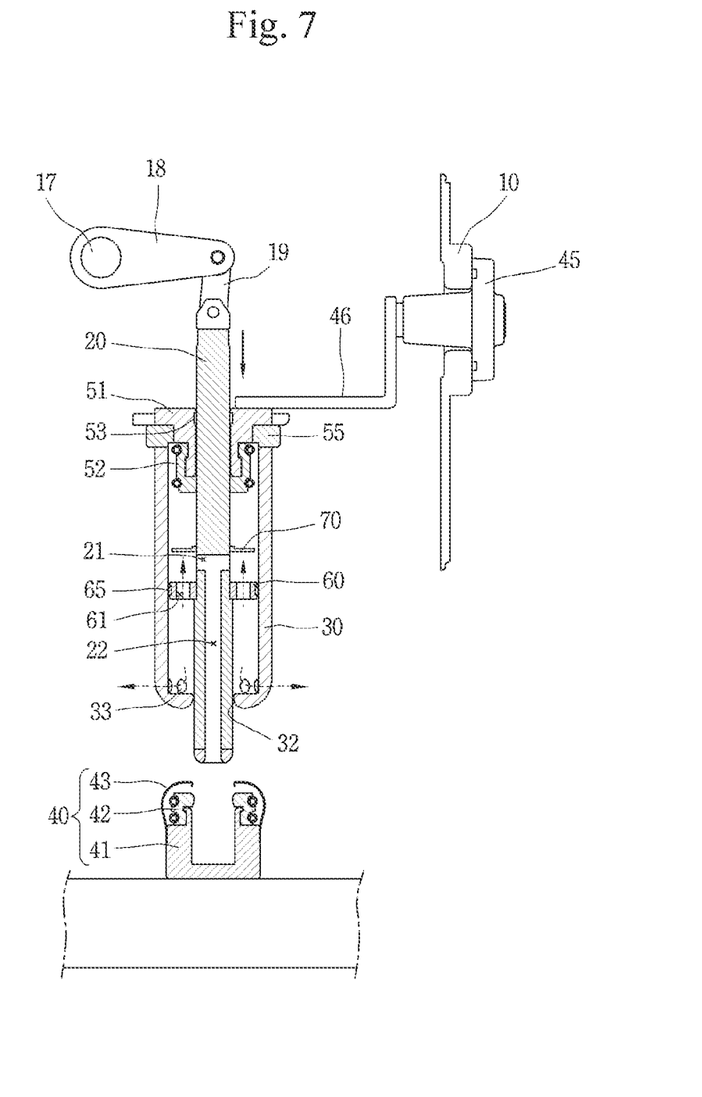
FIG. 7 shows a closing operation state.

FIG. 7 shows a state of proceeding with the closing action. As the movable shaft 17 rotates, the piston member 20 moves downward. The fixed plate 60 moves downward together with the piston member 20, allowing air at a lower part of the fixed plate 60 is discharged to the outside of the cylinder member 30 through the vent holes 33. In addition, air at the lower part of the fixed plate 60 flows upward through the plate through holes 61, which acts as force to push the movable plate 70 upward. Accordingly, the movable plate 70 is moved downward while being spaced apart from the fixed plate 60 by a predetermined distance. When the piston member 20 moves downward, namely, upon the closing action, air at the lower part of the fixed plate 60 of the air inside the cylinder member 30 is discharged through the cylinder hole 32 and the plate through holes 61. Therefore, the reaction acting on the piston member 20 is minimized.

Figure 8:
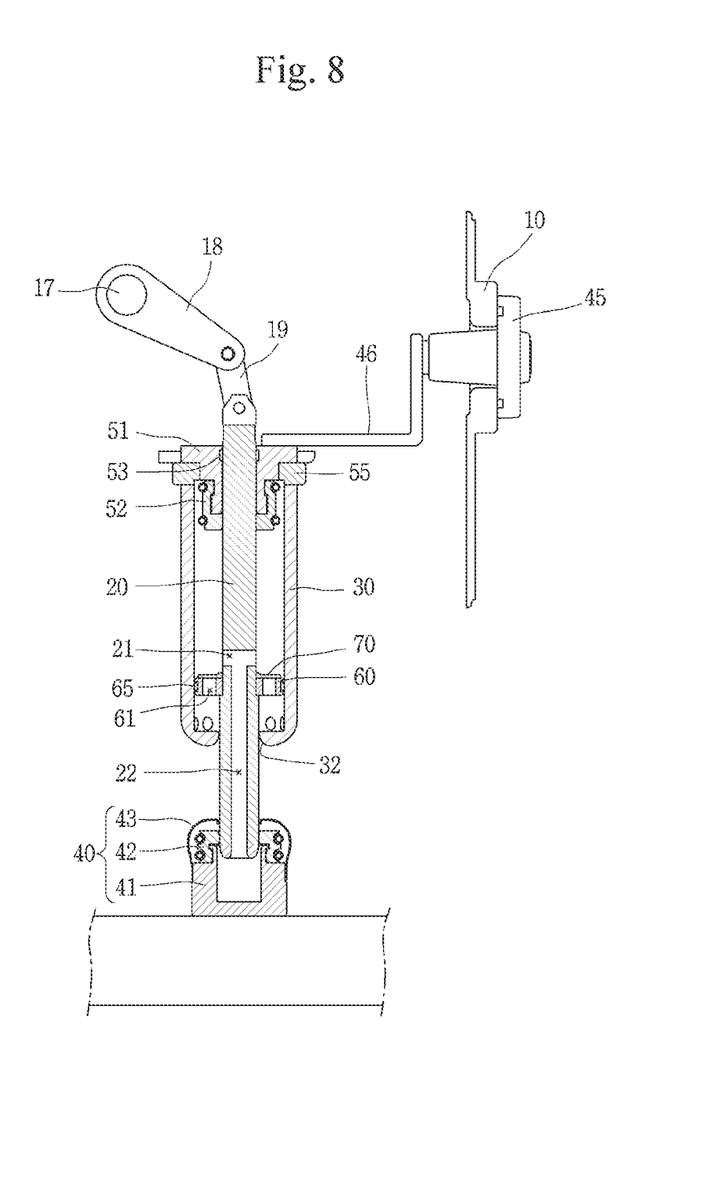
FIG. 8 shows a closed state.

FIG. 8 shows a state in which the closing action is completed. As the lower end of the piston member 20 is brought into contact with the fixed contact 42, the ground circuit is connected. The movement of the fixed plate 60 is stopped so that the movable plate 70 is in contact with the upper portion of the fixed plate 60. Here, the fixed plate 60 is located close to the lower end of the cylinder member 30 but is located above the cylinder hole 32.

Next, an opening action will be described.

FIG. 8 shows a closed state of the high-speed earthing switch. The ground circuit remains connected. The movable plate 70 is in contact with the upper portion of the fixed plate 60. The fixed plate 60 is located close to the lower end of the cylinder member 30 but is located above the cylinder hole 32.

Figure 9:
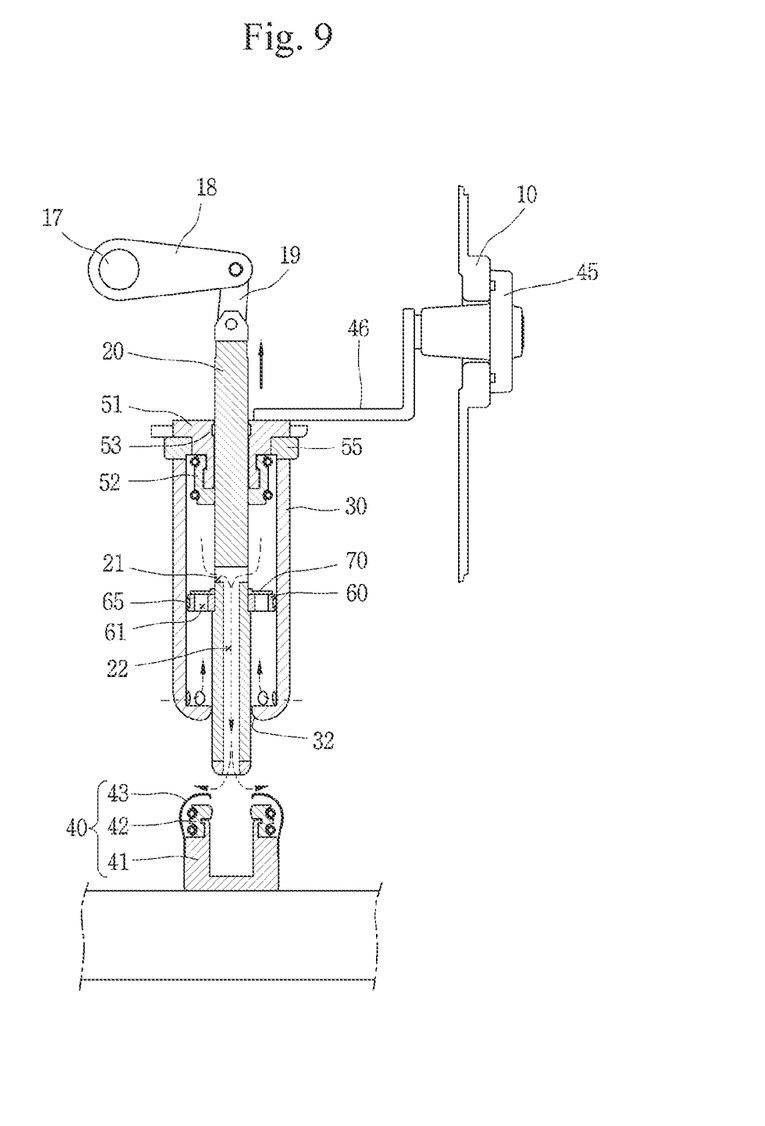
FIG. 9 shows an opening operation state.

FIG. 9 shows a state of proceeding with the opening action. As the movable shaft 17 rotates in a reverse direction, the piston member 20 moves upward. The fixed plate 60 moves upward together with the piston member 20. Since the movable plate 70 is in contact with the upper portion of the fixed plate 60, the plate through holes 61 of the fixed plate 60 are closed. Accordingly, air at the upper parts of the fixed plate 60 and the movable plate 70 is discharged to the outside (lower part) of the cylinder member 30 through the lateral hole 21 and the longitudinal hole 22 of the piston member 20. That is, as the air inside the cylinder member 30 is delivered to the lower part of the piston member 20, wind is blown to the contact portion, more precisely, the fixed part 40. This allows the arc generated by the separation between the piston member 20 and the fixed contact 42 to be extinguished. As a result, the arc blocking performance is improved.

Meanwhile, as air at the outside of the cylinder member 30 is introduced into the cylinder member 30 through the cylinder hole 32, depressurization of the lower part of the fixed plate 60 is prevented. Thus, a decrease in movement speed of the piston member 20 is suppressed.

It will be like FIG. 6 when the opening action is completed.

In the high-speed earthing switch of the gas insulated switchgear according to the one implementation of the present disclosure, the air blower that blows wind to the fixed part when the high-speed earthing switch is opened is provided, and thus the arc can be quickly extinguished. Therefore, the arc blocking performance can be achieved regardless of a type of insulating gas.

Here, as the piston member used in the air blower is formed integrally with the mover, the arc blocking performance can be improved without an increase in the number of components or occupied space.

Further, as the air blower is provided with the fixed plate, the movable plate disposed to be spaced apart from the fixed plate, and the air flow holes formed in the fixed plate and the cylinder member, the flow of air that is injected to the fixed part via the air flow holes is achieved while preventing a reduction in movement speed of the piston member that servers as the mover.

SECOND EXAMPLE

A high-speed earthing switch of the gas insulated switchgear according to another implementation of the present disclosure will be described with reference to FIGS. 10 and 11.

Unlike the previous example, a piston member 160 is separately provided from a mover 120 in this example.

A fixed part 140 that includes a fixed part holder 141, a fixed contact 142, and a fixed part shield 143 is installed at a first conductor 114.

A movable part 150 that includes a movable part holder 151, a movable contact 152, and a movable part shield 153 is installed at a first support member 155. The movable part 150 is installed to be spaced apart from the fixed part 140.

A bus bar 146 is connected to an earth terminal (earth bushing) 145 that is installed at an enclosure 110 and the movable part holder 141.

The mover 120 is connected to a movable shaft 116 through a first crank lever 117. The mover 120 is installed by penetrating through the movable part 150. The mover 120 connects or disconnects a ground circuit by connecting or separating the movable part 150 and the fixed part 140 according to rotation of the movable shaft 116.

A cylinder member 130 is installed at a second support member 156 (or another portion of the first support member). The cylinder member 130 is installed to be spaced apart from the mover 120 by a predetermined distance. An injection hole 131 is provided at a lower portion of the cylinder member 130. The injection hole 131 is formed toward a direction in which the fixed part 140 is installed.

The piston member 160 is inserted and installed in the cylinder member 130. The piston member 160 includes a piston rod 161 that is connected to a second crank lever 118 installed at the movable shaft 116 and a piston plate 162 that is coupled to a lower end of the piston rod 161 to slide inside the cylinder member 130.

The second crank lever 118 protrudes in a direction opposite to the first crank lever 117 so that moving or movement directions of the mover 120 and the piston member 160 are opposite to each other. That is, when the movable shaft 116 rotates in a clockwise direction, the mover 120 moves downward whereas the piston member 160 moves upward. Conversely, when the movable shaft 116 rotates in a counterclockwise direction, the movable member 120 moves upward whereas the piston member 160 moves downward.

An opening action in this example is as follows.

Figure 10:
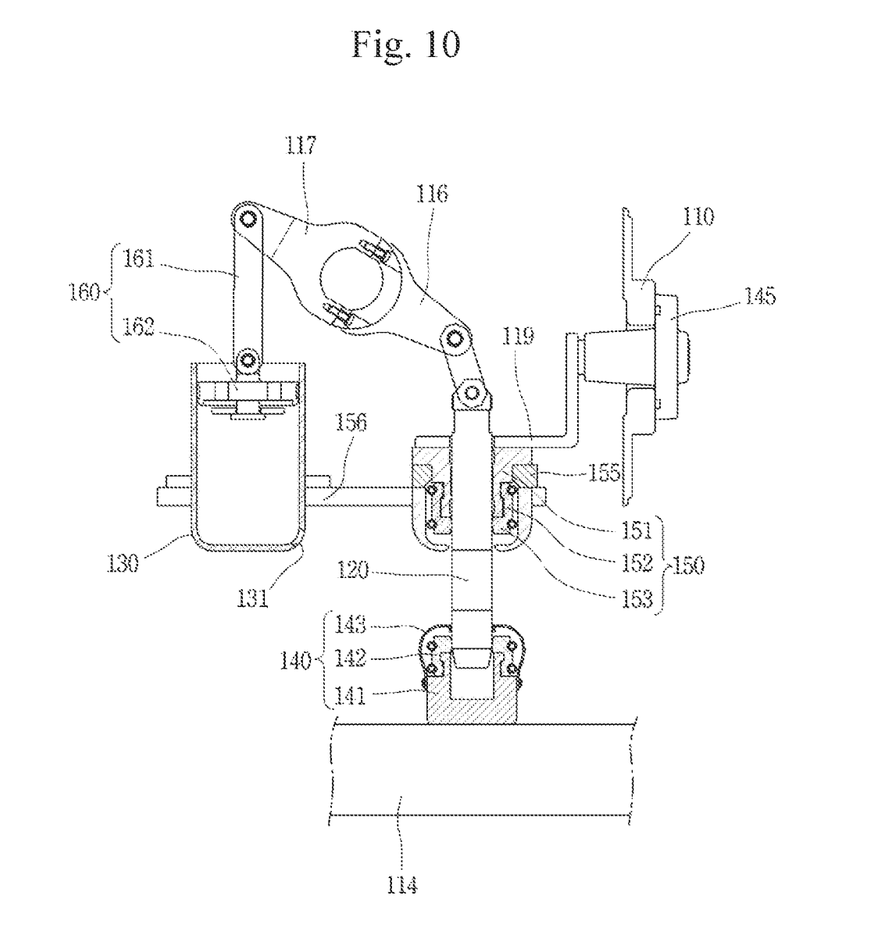
FIG. 10 shows a closed state.
Figure 11:
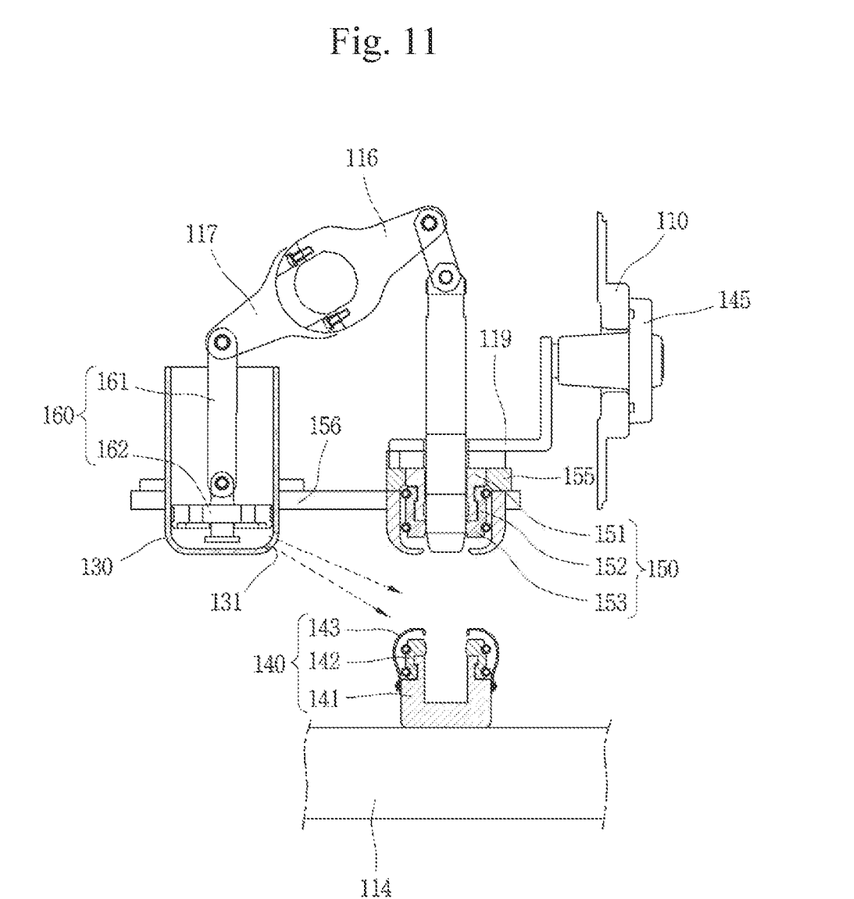
FIG. 11 shows an open state.

In a state as illustrated in FIG. 10, when the movable shaft 116 rotates counterclockwise, the mover 120 moves upward. Then, the mover 120 is separated from the fixed part 140. Accordingly, the ground circuit is open. Here, the piston member 160 moves downward and air inside the cylinder member 130 is injected into the fixed part 140 through the injection hole 131. The arc generated between the fixed part 140 and the mover 120 is extinguished by the air injected through the injection hole 131.

THIRD EXAMPLE

Figure 12:
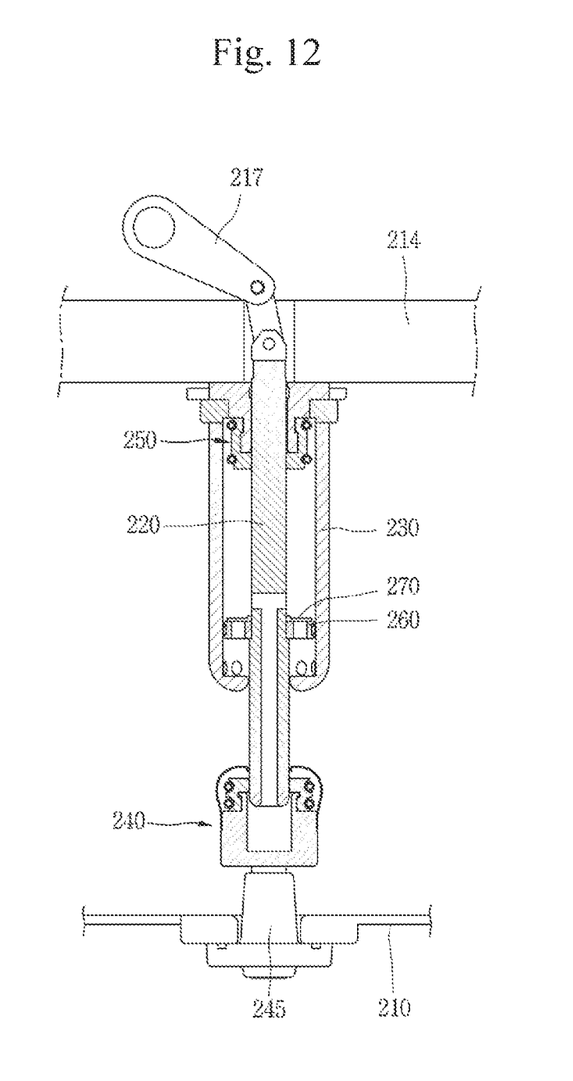
FIG. 12 shows a closed state.
Figure 13:
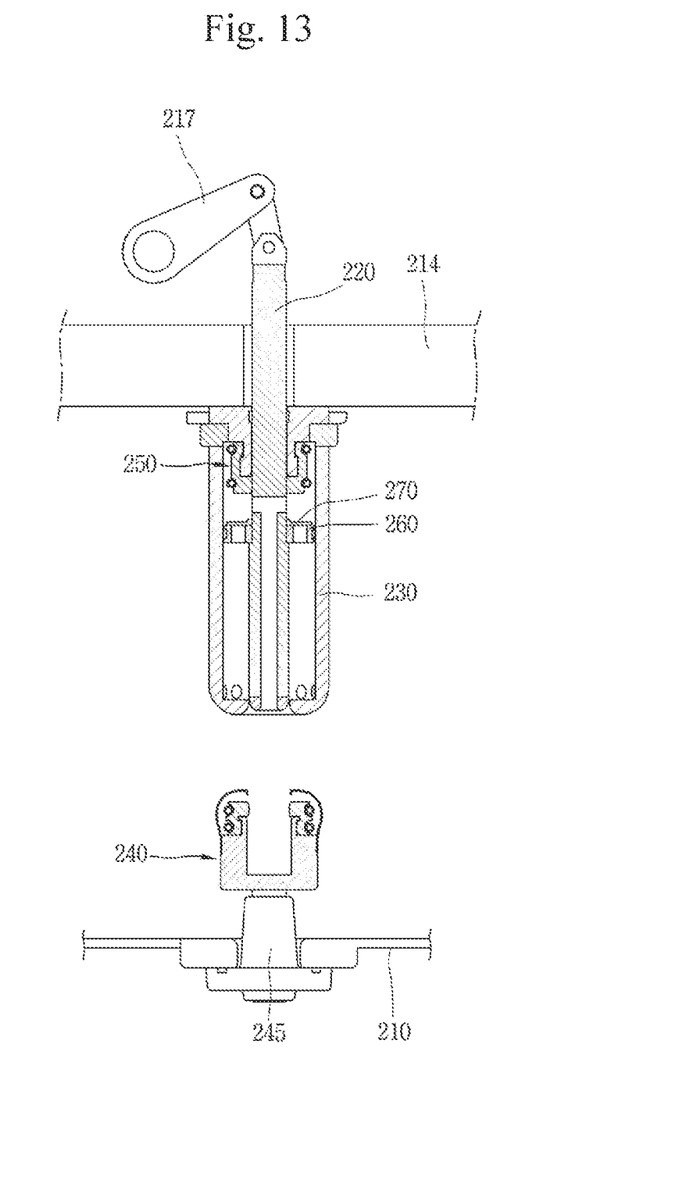
FIG. 13 shows an open state.

A high-speed earthing switch of the gas insulated switchgear according to another implementation of the present disclosure will be described with reference to FIGS. 12 and 13.

Unlike the first example, a piston member 220 is connected to a first conductor 214, which is a main circuit, and a fixed part 240 is connected to an earth terminal 245 in this example. Configurations of the piston member 220 and a cylinder member 30 are substantially the same as those of the first example.

The piston member (mover) 220 connects or disconnects a ground circuit by connecting or separating a movable part 250 and the fixed part 240 according to rotation of a movable shaft 217.

A fixed plate 260 and a movable plate 270 are installed at the piston member 220 like the first example.

Closing and opening actions in this example are similar to those of the first example, so a detailed description thereof will be omitted. The arc generated in the fixed part 240 is extinguished by air delivered from the piston member 160 upon the opening action.

Although preferred implementations have been depicted and described in detail herein, it will be apparent to those skilled in the relevant art that various modifications, additions, substitutions, and the like can be made without departing from the spirit of the disclosure. Therefore, it should be understood that the above-described implementations are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. A high speed earthing switch of a gas insulated switchgear, comprising:
    an enclosure;
    a cylinder member that is installed inside the enclosure and has a vent hole formed at a lower portion along a circumferential surface thereof; and
    a piston member that is insertedly installed in the cylinder member and moves forward and backward by receiving force from a drive unit so as to inject air inside the cylinder member to a contact portion when in an open state,
    wherein a lateral hole is formed at an intermediate portion of the piston member,
    wherein the piston member is provided with a longitudinal hole that extends from the lateral hole to a lower end thereof.

2. The switch of claim 1, wherein a cylinder hole in formed in a lower surface of the cylinder member so as to allow the piston member to move along a lengthwise direction.

3. The switch of claim 1, wherein a fixed plate is installed at the intermediate portion of the piston member.

4. The switch of claim 3, wherein the fixed plate is disposed below the lateral hole.

5. The switch of claim 3, wherein a plurality of plate through holes is formed in the fixed plate.

6. The switch of claim 5, wherein a movable plate is disposed above the fixed plate in a manner of sliding along the piston member.

7. The switch of claim 6, wherein the movable plate has an outer diameter smaller than an outer diameter of the fixed plate.

8. The switch of claim 7, wherein the movable plate is provided with a central hole that has a guide portion with a predetermined height.

9. The switch of claim 6, wherein the outer diameter of the movable plate has a size that is enough to completely cover the plate through holes when the movable plate is in contact with the fixed plate.

10. The switch of claim 1, wherein lengthwise directions of the cylinder member and the piston member are directions other than a horizontal direction.

* * * * *